Jan. 20, 1959  C. H. VAN HARTESVELDT ET AL  2,869,173
SAFETY DEVICE FOR DIAPHRAGM ACTUATED MEANS
Filed June 11, 1956  2 Sheets-Sheet 1

Inventors
Carroll H. Van Hartesveldt
Charles S. Davidson
Attys

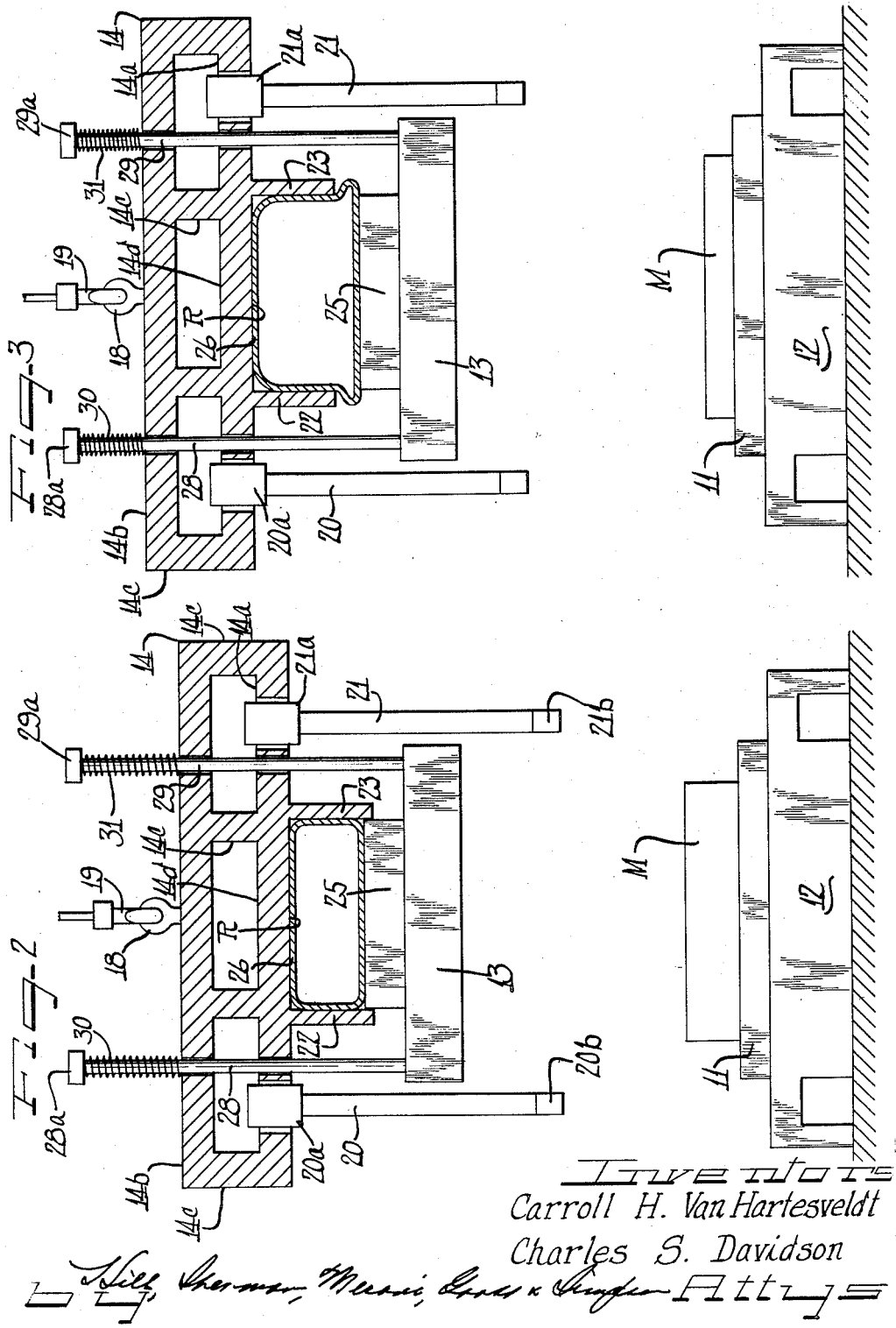

2,869,173

SAFETY DEVICE FOR DIAPHRAGM ACTUATED MEANS

Carroll H. Van Hartesveldt, Birmingham, Mich., and Charles S. Davidson, Toledo, Ohio; said Davidson assignor, by mesne assignments, to said Van Hartesveldt Application June 11, 1956, Serial No. 590,740

1 Claim. (Cl. 18—16)

This invention relates to molding apparatus, and more particularly, to a safety device for diaphragm actuated means in a molding press.

Although the instant molding apparatus may lend itself to a number of molding operations, the instant invention is particularly useful in the field of low pressure large size laminate molding and, accordingly, the use thereof will be described primarily in connection with such molding. In recent times, there has been an increasing demand for large size laminated articles and it has been necessary to develop new molding techniques and devices to meet this demand. Heretofore, the most effective production method available for the manufacture of large size laminates involved the use of steam or water heated matched metal dies operating in a hydraulic press. As will be appreciated, for the larger laminates, these dies are extremely expensive; and the use of hydraulic press actuating means puts a practical limitation on the space available between the mold defining members when the mold is open.

Recently, there has been developed a molding press comprising large size lightweight mold defining members made, for example, of heat resistant synthetic resins. In these devices one of the mold defining members is mounted on a stationary support and the other is mounted in a carriage which is movable above the fixed mold defining member by means of a hoist or other relatively low power moving means, so that the space between the mold defining members in the open position may be quite substantial. When pressure is to be applied between the mold defining members, the carriage is lowered to approximately "closed mold" position and strong linking arms are mounted to connect the carriage securely with the fixed mold defining member. The carriage mounted mold defining member is secured to a platen which is, in turn, slidably received in a recess in the carriage. A resilient bag is also mounted in the recess and connected to a source of fluid under pressure. Actual molding pressure between the mold defining members is thus applied by applying fluid pressure to the bag and expanding the bag against the platen which, in turn, urges the movable mold defining member downwardly against the fixed mold defining member. The pressure thus applied is quite substantial, but the linking arms are strong enough to securely connect the carriage to the fixed molding member, so that this substantial amount of pressure through the resilient bag may be applied to molding material between the mold defining members.

When the mold is to be opened, the linking arms are disconnected and the hoist raises the carriage vertically a substantial distance. The resilient bag cannot, of course, support conveniently the platen and the lightweight mold defining member carried thereby. Instead, relatively lightweight tie rods are connected to the platen and/or movable mold member (carried thereby) and the tie rods are mounted on the carriage proper. The difficulty here is that when the press is in "open mold" position there is a possibility that fluid under pressure will leak into the resilient bag, perphaps through a defective valve. The very substantial amount of force which can be developed by flowing fluid under pressure into the resilient bag is easily sufficient to shear the ordinary lightweight tie rods which normally support only the weight of the platen and the movable mold defining member. This would then result in smashing the platen and movable mold defining member down onto workers who might be placing molding material in position on the fixed mold defining member.

The instant safety device affords a resilient connection between the tie rods and the carriage, preferably in the form of springs connected to the tie rods. The springs are sufficiently strong to support the weight of the platen and the movable mold defining member, but the springs will yield to the expansion of the resilient bag by fluid under pressure. In this way the bag may expand so as to force the platen out of the recess in the carriage wherein the platen is normally positioned and the bag then is itself no longer supported by the side walls of the recess in the carriage so that it will expand laterally and ultimately rupture rather than forcing the platen and movable mold defining member carried thereby downwardly further.

It is, therefore, an important object of the present invention to provide an improved molding press.

It is a further object of the instant invention to provide an improved safety device for a molding press whereby accidents caused by the inadvertent actuation of a diaphragm means may be avoided.

A further object of the instant invention is to provide a means for steadying otherwise loosely connected press platen and carriage members.

Other and further objects, features and advantages of the present invention will become apparent to those skilled in the art from the following detailed disclosure thereof and drawings attached hereto and made a part hereof.

On the drawings:

Figure 2 is a view similar to Figure 1, but showing the press in "open" position; and Figure 3 is a view similar to Figure 2, but showing the diaphragm means fully expanded through inadvertent actuation of the diaphragm means when the mold is in "open" position.

As shown on the drawings:

Figure 1:
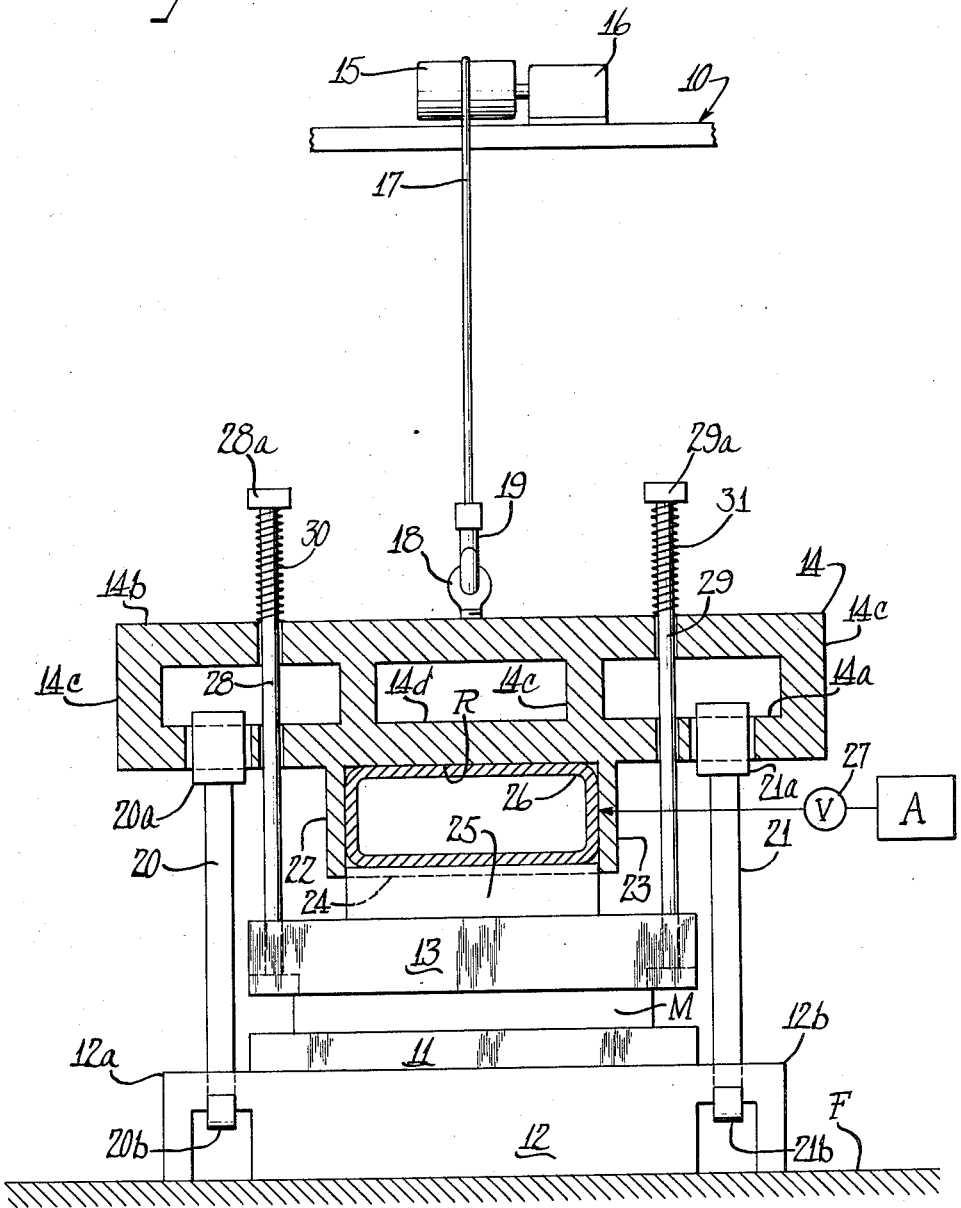
Figure 1 is an elevational view, with parts shown in section and parts shown diagrammatically of a molding press embodying the instant invention in "closed" position.

In Figure 1 the molding press, indicated generally by the reference numeral 10, is shown in "closed" position. The press 10 comprises a lower fixed mold defining member 11 secured (by bolts or the like, not shown) to a stationary frame 12 mounted on the floor or similar supporting structure F. A cooperating movable upper mold defining member 13 is mounted above the lower mold dedefining member 11, with the material to be molded M positioned therebetween. As will be appreciated, the mold defining members 11 and 13 here shown are substantially flat for the purpose of molding a large flat sheet of material M; but it will be appreciated that the mold defining members 11 and 13 may be suitably contoured so as to form laminated sheets in the shape of boats, bathtubs, or the like large size laminate articles.

A vertically movable carriage 14 (shown in section) is mounted for movement by a hoist, here shown as a rotatable drum 15, powered by a motor 16 and winding a cable 17 that connects to a ring 18 on the carriage 14 via a hook 19 in the customary manner. The carriage 14 is made of relatively strong structural elements in the form of a steel frame-work which is still sufficiently light to be carried by the lightweight hoist assembly 15, 16.

As shown in Figure 1, the carriage 14 is provided with a plurality of depending hooks 20, 21 which are looped at their tops 20a, 21a so as to be swingably mounted on a lower cross beam 14a of the carriage 14. The bottoms 20b and 21b of the members 20 and 21 are hooked under projecting frame portions 12a and 12b of the fixed support 12, so that the carriage 14 is, in the position shown in Figure 1, securely tied to the fixed support 12 and the fixed mold defining member 11 carried thereby.

As is indicated, the carriage 14 has lower cross beams at the position 14a and upper cross beams at the position 14b with spacers 14c therebetween for additional support. Actually, the carriage 14 in plan view is generally rectangular in shape and a total of four hooks are mounted at the corners, although only the front hooks 20 and 21 can be seen in the view of Figure 1.

The carriage 14 has a recess R therein defined by side walls (only three of which 22, 23 and 24 are here shown) and a back or top wall 14d. The walls 22, 23, 24 and a front wall (not shown) define a generally rectangular recess which slidably receives a generally rectangular platen 25. The platen 25 securely mounts the upper mold defining member 13 (as with bolts, not shown) and the platen 25 and upper mold defining member 13 move together. A resilient bag 26 or similar fluid expandable means is mounted within the recess R and against the top of the platen 25, or between the back wall 14d and the platen 25. A source of fluid under pressure such as a compressed air source A is connected through a valve 27 to the bag 26, as indicated diagrammatically, in order to selectively expand the bag 26 and urge the platen 25 downwardly and out of the recess R.

During the actual molding operation, it will be appreciated that the carriage 14 is so positioned with respect to the fixed mold elements 11 and 12 and the material M to be molded that only limited movement of the platen 25 and movable mold member 13 is involved when the bag 26 is actuated. In this way the sides of the bag 26 are continuously supported by the carriage side walls 22, 23, 24, and the platen 25 is never actually moved out of the recess R. Such limited movement is permitted by tie rods 28 and 29 which are securely embedded in the movable mold member 13, so as to afford a fixed connection between the tie rods 28, 29 and the movable mold member 13 as well as the platen 25. The tie rods 28 and 29 are slidably received by the carriage 14 and resiliently mounted thereon by springs 30 and 31. The tie rod 28 is permitted limited axial movement in the carriage 14 and the spring 30 which acts between the top beam 14b of the carriage 14 and a lock nut 28a at the top of the rod 28 is under light compression in the position shown in Figure 1, even when the bag 26 is actuated. This is because the carriage 14 is initially positioned in the "closed" position so that the upper mold defining member 13 rests upon the molding material M and is fully supported thereby so as to take this weight off the spring 30. The same is true for the spring 31. The light compression results from a pre-set tension sufficient to support the weight of 13 and 25 when the mold is in the open position as shown in Figure 2. Subsequent downward motion of platen 25 when urged by bay 26 will compress the springs a slight additional amount. Again, it will be appreciated that more than two tie rods 28, 29 and spring 30, 31 assemblies are used and preferably four are used to mount the four corners of the generally rectangular mold member 13 and platen 25.

Referring now to Figure 2, it will be seen that the press 10 is in "open" position. To open the press 10, the bag 26 is first deflated so that no downward pressure is applied by the upper mold member 13. Then, the hooks 20, 21 are disconnected from the fixed support 12. Next, the hoist assembly 15, 16 lifts the carriage 14 to the "open" position. At this time, the springs 30 and 31 are loaded slightly so as to support the weight of the platen 25 and upper mold member 13. The springs 30 and 31 are resilient means which are strong enough to support the weight of the upper mold member 13 and the platen 25, while retaining the platen 25 in approximately its normal operating position, which is within the mouth of the recess R, as shown.

In the position of Figure 2, operators may have ready access to the lower mold member 11 and may lay down the sheets of resin impregnated fabric, or whatever other molding material M is being used. If, however, the compressed air valve 27 should develop a leak or be turned on accidentally the bag 26 would again be actuated and would urge the platen 25 downwardly. The tie rods of the size of the tie rods 28 and 29 here shown which might be securely fixed to the carriage 14 would be readily sheared by the extremely great force which can be generated through actuation of the bag 26. Accordingly, it has been necessary to mount the platen 25 on resilient means, as here shown, via the springs 30 and 31. As is shown in Figure 3, the springs 30 and 31 will yield to the actuated bag 26, so that the bag 26 may force the platen 25 completely out of the recess R and the bag 26 will expand carrying the platen 25 out of the recess R itself. Once the platen 25 has cleared the side walls 22, 23, 24 the bag 26 will expand sideways in the direction of least resistance and will no longer urge the platen 25 downwardly. The springs 30 and 31 are, of course, compressible to the extent necessary to permit such movement of the platen 25 out of the recess R. Further expansion of the bag at this stage will result in rupture thereof, but will not result in dropping of the platen 25 and mold member 13 into the working space just above the fixed mold member 11. Because the mold member 13 rigidly assembled to platen 25 would otherwise be loosely connected to carriage 14, the springs 30 and 31 provide a steadying means which makes the engagement of hooks 20 and 21 more positive and precise. Aligning means (not shown) between the mold members 13 and 11 are also engaged more precisely and positively because of the steadying influence of springs 30 and 31.

It will be appreciated that resilient means other than the springs 30 and 31 could be used. For example, hydraulic means having relatively small pressure areas (substantially less than the pressure area of the bag 26) could be used to mount the tie rods 28 and 29. Also, other fluid expandible means can be used in place of the bag 26. In effect, what is required is a fluid expandable flexible container, or a fluid expandable element having a flexible wall adjacent the platen 25, which will clear the recess R when the platen 25 clears the recess and will then expand laterally.

It will be understood that modifications and variations may be effected without departing from the spirit and scope of the novel concepts of this invention.

We claim as our invention:

A molding press comprising a lower fixed mold defining member, a vertically movable carriage above the lower member having a recess therein defined by side walls and a top wall, an upper platen mounting a cooperating mold-defining member movable in and out of said recess, a resilient bag within the recess between the top wall and the upper platen, a source of fluid under pressure connected to the bag to selectively expand the bag and urge the upper platen out of the recess, means selectively moving the carriage toward and away from the fixed member, whereby a substantial amount of working space may be provided between said members, and resilient means mounted on the carriage normally carrying the platen in said recess, said resilient means being yieldable to expansion of said bag by fluid pressure so as to permit the bag to expand, carrying the upper platen, beyond the side walls and thus rupture rather than forcing the platen into the normal working space between the members.

References Cited in the file of this patent

UNITED STATES PATENTS

| | | |
|---|---|---|
| 2,148,704 | Merritt | Feb. 28, 1939 |
| 2,317,823 | Strauss | Apr. 27, 1943 |
| 2,565,949 | Clifford et al. | Aug. 28, 1951 |
| 2,671,940 | Billner | Mar. 16, 1954 |
| 2,696,184 | Demarest | Dec. 7, 1954 |